(12) United States Patent
Wolfe et al.

(10) Patent No.: US 7,991,639 B2
(45) Date of Patent: Aug. 2, 2011

(54) DETERMINING READINESS OF AN ORGANIZATION TO UTILIZE AN INFORMATION TECHNOLOGY ASSET

(75) Inventors: Martin A. Wolfe, Alpharetta, GA (US); Francis X. Reddington, Sarasota, FL (US)

(73) Assignee: International Business Machines Corporation, Armonk, NY (US)

( * ) Notice: Subject to any disclaimer, the term of this patent is extended or adjusted under 35 U.S.C. 154(b) by 1257 days.

(21) Appl. No.: 11/615,228

(22) Filed: Dec. 22, 2006

(65) Prior Publication Data

US 2008/0154695 A1   Jun. 26, 2008

(51) Int. Cl.
*G06F 17/30* (2006.01)
(52) U.S. Cl. ......................................................... 705/10
(58) Field of Classification Search ....................... 705/10
See application file for complete search history.

(56) References Cited

U.S. PATENT DOCUMENTS

| 7,124,101 | B1* | 10/2006 | Mikurak ........................ 705/35 |
| 7,440,903 | B2* | 10/2008 | Riley et al. ..................... 705/1.1 |
| 2003/0055660 | A1 | 3/2003 | Gusler et al. |
| 2004/0148208 | A1* | 7/2004 | Weathersby ....................... 705/7 |
| 2005/0033620 | A1 | 2/2005 | Gloor et al. |
| 2005/0144062 | A1 | 6/2005 | Mittal et al. |
| 2005/0197970 | A1 | 9/2005 | Chehade et al. |
| 2006/0004596 | A1 | 1/2006 | Caniglia et al. |
| 2007/0050239 | A1* | 3/2007 | Caneva ............................ 705/11 |
| 2007/0299720 | A1* | 12/2007 | Tafoya ............................ 705/11 |

FOREIGN PATENT DOCUMENTS

WO   WO2005031710 A2   4/2005

OTHER PUBLICATIONS

Huang et al "(An Indicator System for Assessing Enterprises E-Readiness and it's Application in Chiness Retailing", Dec. 2003, Americas Conference on Information Systems (AMCIS)), pp. 1-10.*

\* cited by examiner

*Primary Examiner* — Romain Jeanty
(74) *Attorney, Agent, or Firm* — Anna L. Linne; Hoffman Warnick LLC

(57) ABSTRACT

The present invention provides a solution that determines the readiness of a target organization to utilize an IT asset. Specifically, under the present invention, baseline criteria for determining the readiness of the target organization to utilize the IT asset are first identified. The baseline criteria are then refined (e.g., via personnel interviews, market research, etc.) to yield readiness criteria. A score is assigned to each of the readiness criteria for the target organization, and then optionally weighted. Using the scores (weighted or un-weighted), a readiness value for the target organization is computed and compared to a threshold value to determine the readiness of the target organization. Based on the results, at least one graphical depiction showing the readiness of the target organization can be generated.

28 Claims, 11 Drawing Sheets

| PORTAL READINESS ANALYSIS |
|---|
| SKILL --- 2.0 |
| COMMUNITY --- 2.5 |
| COST --- 1.0 |
| CULTURE --- 4.0 |
| DESIRE/NEED --- 3.0 |
| ENHANCEMENT CAPABILITY --- 1.0 |
| IMPLEMENTATION SPEED --- 3.0 |
| INTEGRATION --- 3.0 |
| PERCEIVED BENEFIT --- 3.0 |
| SECURITY --- 3.0 |
| STABILITY --- 3.0 |
| SUPPORT INDEMNIFICATION --- 3.0 |
| INNOVATION --- 4.0 |
| USER GROUPS & ROLES --- 4.0 |
| AUDIENCE & END-USER INTERFACE --- 4.0 |
| CONTENT TYPES --- 4.0 |
| CONTENT SOURCES --- 4.0 |

| PORTAL READINESS ANALYSIS |
| --- |
| SKILL --- 2.0 |
| COMMUNITY --- 3.0 |
| COST --- 3.0 |
| CULTURE --- 2.0 |
| DESIRE/NEED --- 4.0 |
| ENHANCEMENT CAPABILITY --- 4.0 |
| IMPLEMENTATION SPEED --- 4.0 |
| INTEGRATION --- 4.0 |
| PERCEIVED BENEFIT --- 4.0 |
| SECURITY --- 1.0 |
| STABILITY --- 3.0 |
| SUPPORT INDEMNIFICATION --- 0.0 |
| INNOVATION --- 3.0 |
| USER GROUPS & ROLES --- 1.0 |
| AUDIENCE & END-USER INTERFACE --- 1.5 |
| CONTENT TYPES --- 1.0 |
| CONTENT SOURCES --- 1.0 |

FIG. 6

DETERMINING READINESS OF AN ORGANIZATION TO UTILIZE AN INFORMATION TECHNOLOGY ASSET

FIELD OF THE INVENTION

The present invention generally relates to a target organization readiness analysis. Specifically, the present invention determines the readiness of a target organization to utilize an IT asset (e.g., hardware, software, etc.).

BACKGROUND OF THE INVENTION

In many situations, technologies, tools, or processes are chosen as the basis or part of a solution due to their convenience, sales incentive, a lack of knowledge of other options, or a lack of knowledge of the target environment (e.g., an organization, system, or solution). The set of technologies, tools, and processes are referred to as "assets" herein. Determining the correct asset(s) to use in a solution is often more time consuming than merely using what is best known or more readily available. As such, five core issues are typically encountered: (1) the inefficient or wasteful use of time and money; (2) the inability to deliver a solution that properly and correctly addresses the needs of the target organization/target environment; (3) the creation of a solution to justify the use of a particular asset; (4) obstacles to successful delivery of a solution remain unknown but continue to be impediments to success; and (5) a team's business credibility is diminished through focusing (and pushing) a specific asset without the appropriate business justifications.

Heretofore, the core solution approach in addressing these issues included pursuing a clear understanding of the needs of the target environment and focusing on identifying the correct assets available to address those needs. Moreover, engagement teams will often analyze an existing solution or initiative to ensure the needs and available assets are identified. This is achieved through measuring the capability or maturity of the initiative, once a solution or engagement has already begun.

Unfortunately, the current solutions available often take a lengthy time to conduct root cause analysis of the core issues. In addition, this analysis occurs once a solution path has been chosen, during an engagement. This is a reactionary approach that is based on addressing existing problems, in progress, instead of preventing problems before they occur and often requires a "course change" to repair the identified issues. In addition, many existing capability and maturity assessments take a holistic ("end-to-end") view, and thus require a time consuming effort. Thus, existing approaches have these drawbacks (among others): (1) determination of obstacles during the engagement makes it harder to resolve those issues; and (2) resolving obstacles during an engagement will significantly increase the cost to resolve those issues.

In view of the foregoing, there exists a need for a solution that solves at least one of the deficiencies in the related art.

SUMMARY OF THE INVENTION

In general, the present invention provides a solution that determines the readiness of a target organization to utilize an IT asset. Specifically, under the present invention, baseline criteria for determining the readiness of the target organization to utilize the IT asset are first identified. The baseline criteria are then refined (e.g., via personnel interviews, market research, etc.) to yield readiness criteria. A score is assigned to each of the readiness criteria for the target organization, and then optionally weighted. Using the scores (weighted or un-weighted), a readiness value for the target organization is computed and compared to a threshold value to determine the readiness of the target organization. Based on the results, at least one graphical depiction showing the readiness of the target organization can be generated.

A first aspect of the present invention provides a method for determining a readiness of a target organization to utilize an Information Technology (IT) asset, comprising: identifying baseline criteria for determining the readiness of the target organization to utilize the IT asset; refining the baseline criteria to yield readiness criteria; assigning a score to each of the readiness criteria for the target organization; computing a readiness value for the target organization using the scores; comparing the readiness value to a threshold value to determine the readiness of the target organization; and generating at least one graphical depiction showing the readiness of the target organization.

A second aspect of the present invention provides a system for determining a readiness of a target organization to utilize an Information Technology (IT) asset, comprising: a system for identifying baseline criteria for determining the readiness of the target organization to utilize the IT asset; a system for refining the baseline criteria to yield readiness criteria; a system for assigning a score to each of the readiness criteria for the target organization; a system for computing a readiness value for the target organization using the scores; a system for comparing the readiness value to a threshold value to determine the readiness of the target organization; and a system for generating at least one graphical depiction showing the readiness of the target organization.

A third aspect of the present invention provides a program product stored on a computer useable medium for determining a readiness of a target organization to utilize an Information Technology (IT) asset, the computer useable medium comprising program code for causing a computer system to perform the following steps: identifying baseline criteria for determining the readiness of the target organization to utilize the IT asset; refining the baseline criteria to yield readiness criteria; assigning a score to each of the readiness criteria for the target organization; computing a readiness value for the target organization using the scores; comparing the readiness value to a threshold value to determine the readiness of the target organization; and generating at least one graphical depiction showing the readiness of the target organization.

A fourth aspect of the present invention provides a method for deploying a system for determining a readiness of a target organization to utilize an Information Technology (IT) asset, comprising: providing a computer infrastructure being operable to: identify baseline criteria for determining the readiness of the target organization to utilize the IT asset; refine the baseline criteria to yield readiness criteria; assign a score to each of the readiness criteria for the target organization; compute a readiness value for the target organization using the scores, and compare the readiness value to a threshold value to determine the readiness of the target organization; and generate at least one graphical depiction showing the readiness of the target organization.

A fifth aspect of the present invention provides computer software embodied in a propagated signal for determining a readiness of a target organization to utilize an Information Technology (IT) asset, the computer software comprising instructions for causing a computer system to perform the following steps: identifying baseline criteria for determining the readiness of the target organization to utilize the IT asset; refining the baseline criteria to yield readiness criteria; assigning a score to each of the readiness criteria for the target organization; computing a readiness value for the target organization using the scores; comparing the readiness value to a threshold value to determine the readiness of the target organization; and generating at least one graphical depiction showing the readiness of the target organization.

A sixth aspect of the present invention provides a business method for determining a readiness of a target organization to utilize an Information Technology (IT) asset.

BRIEF DESCRIPTION OF THE DRAWINGS

These and other features of this invention will be more readily understood from the following detailed description of the various aspects of the invention taken in conjunction with the accompanying drawings in which:

FIG. 4 depicts an illustrative chart of baseline criteria in accordance with the present invention.

FIG. 6 depicts an illustrative chart of readiness criteria in accordance with the present invention.

Figure 1:
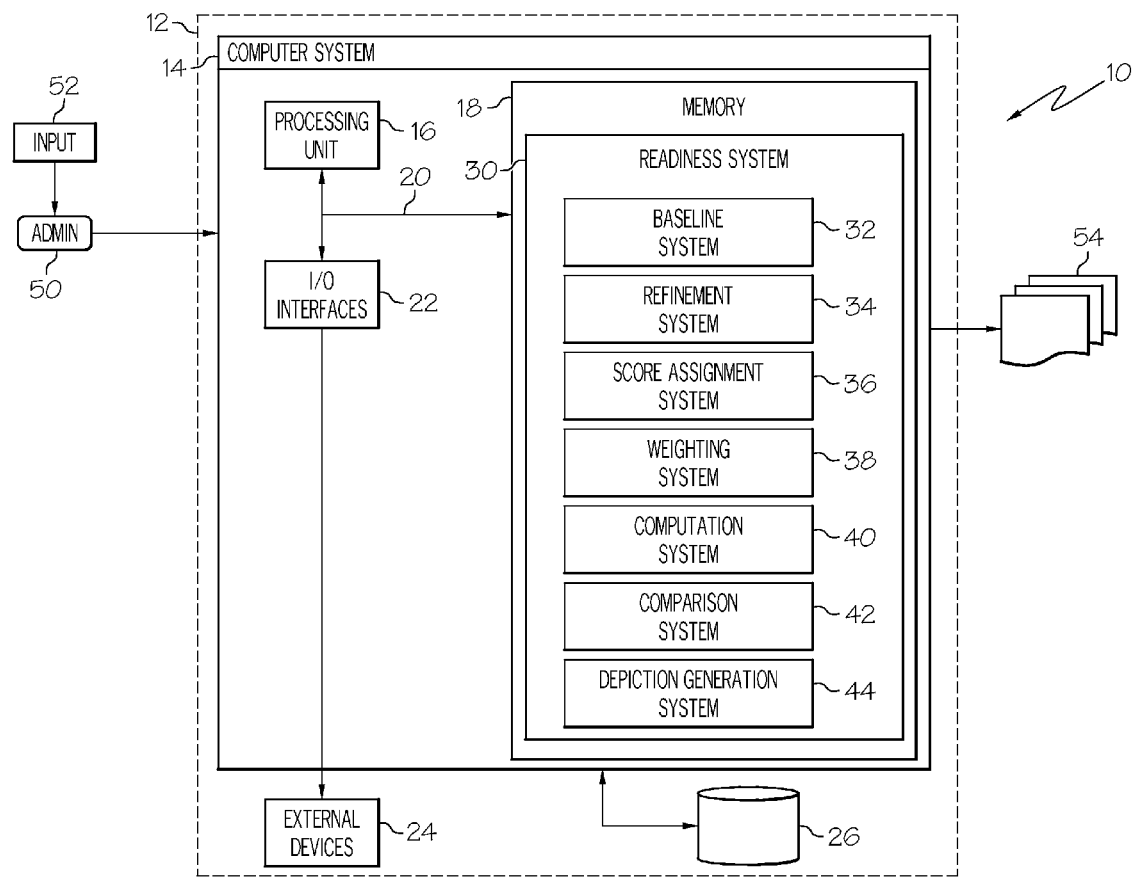
FIG. 1 depicts a system for determining the readiness of a target organization to utilize an IT asset in accordance with the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a solution that determines the readiness of a target organization to utilize an IT asset. Specifically, under the present invention, baseline criteria for determining the readiness of the target organization to utilize the IT asset are first identified. The baseline criteria are then refined (e.g., via personnel interviews, market research, etc.) to yield readiness criteria. A score is assigned to each of the readiness criteria for the target organization, and then optionally weighted. Using the scores (weighted or un-weighted), a readiness value for the target organization is computed and compared to a threshold value to determine the readiness of the target organization. Based on the results, at least one graphical depiction showing the readiness of the target organization can be generated.

Referring now to FIG. 1, a system 10 for determining the readiness of a target organization to utilize an IT asset according to the present invention is shown. As depicted, system 10 includes a computer system 14 deployed within a computerized infrastructure/environment 12. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computerized infrastructure 12 is intended to demonstrate that some or all of the components of system 10 could be deployed, managed, serviced, etc. by a service provider who offers to make readiness determinations according to the present invention.

As shown, computer system 14 includes a processing unit 16, a memory 18, a bus 20, and input/output (I/O) interfaces 22. Further, computer system 14 is shown in communication with external I/O devices/resources 24 and storage system 26. In general, processing unit 16 executes computer program code, such as readiness system 30, which is stored in memory 18 and/or storage system 26. While executing computer program code, processing unit 16 can read and/or write data to/from memory 18, storage system 26, and/or I/O interfaces 22. Bus 20 provides a communication link between each of the components in computer system 14. External devices 24 can comprise any devices (e.g., keyboard, pointing device, display, etc.) that enable a user to interact with computer system 14 and/or any devices (e.g., network card, modem, etc.) that enable computer system 14 to communicate with one or more other devices.

Computerized infrastructure 12 is only illustrative of various types of computer infrastructures for implementing the invention. For example, in one embodiment, computerized infrastructure 12 comprises two or more devices (e.g., a server cluster) that communicate over a network to perform the various process of the invention. Moreover, computer system 14 is only representative of various possible computer systems that can include numerous combinations of hardware. Computer system 14 can comprise any specific purpose providing article of manufacture comprising hardware and/or computer program code for performing specific functions, any providing article of manufacture that comprises a combination of specific purpose and general purpose hardware/software, or the like. In each case, the program code and hardware can be created using standard programming and engineering techniques, respectively. Moreover, processing unit 16 may comprise a single processing unit, or be distributed across one or more processing units in one or more locations, e.g., on a client and server. Similarly, memory 18 and/or storage system 26 can comprise any combination of various types of data storage and/or transmission media that reside at one or more physical locations. Further, I/O interfaces 22 can comprise any system for exchanging information with one or more external devices 24. Still further, It is understood that one or more additional components (e.g., system software, math co-processing unit, etc.) not shown in FIG. 1 can be included in computer system 14. However, if computer system 14 comprises a handheld device or the like, it is understood that one or more external devices 24 (e.g., a display) and/or storage system 26 could be contained within computer system 14, not externally as shown.

Storage system 26 can be any type of system (e.g., a database) capable of providing storage for information under the present invention. To this extent, storage system 26 could include one or more storage devices, such as a magnetic disk drive or an optical disk drive. In another embodiment, storage system 26 includes data distributed across, for example, a local area network (LAN), wide area network (WAN) or a storage area network (SAN) (not shown). In addition, although not shown, additional components, such as cache memory, communication systems, system software, etc., may be incorporated into computer system 14.

Shown in memory 18 of computer system 14 is readiness system 30, which includes baseline system 32, refinement system 34, score assignment system 36, weighting system 38, computation system 40, comparison system 42, and depiction generation system 44. It should be appreciated that the same functionality could be implemented with a different configuration of systems and/or sub-systems than is shown in FIG. 1. This depiction is intended to be illustrative only.

In any event, assume that a particular IT asset has been identified for an organization/customer (hereinafter referred to as a target organization). Readiness system 30 will determine the readiness of the target organization to utilize the identified IT asset. The process typically commences with the identification of baseline criteria. To this extent, an administrator 50 or the like can provide the baseline criteria via an interface provided by baseline system 32. Alternatively, baseline system 32 could obtain the baseline criteria from memory 18, storage system 26 and/or another source.

Figure 2:
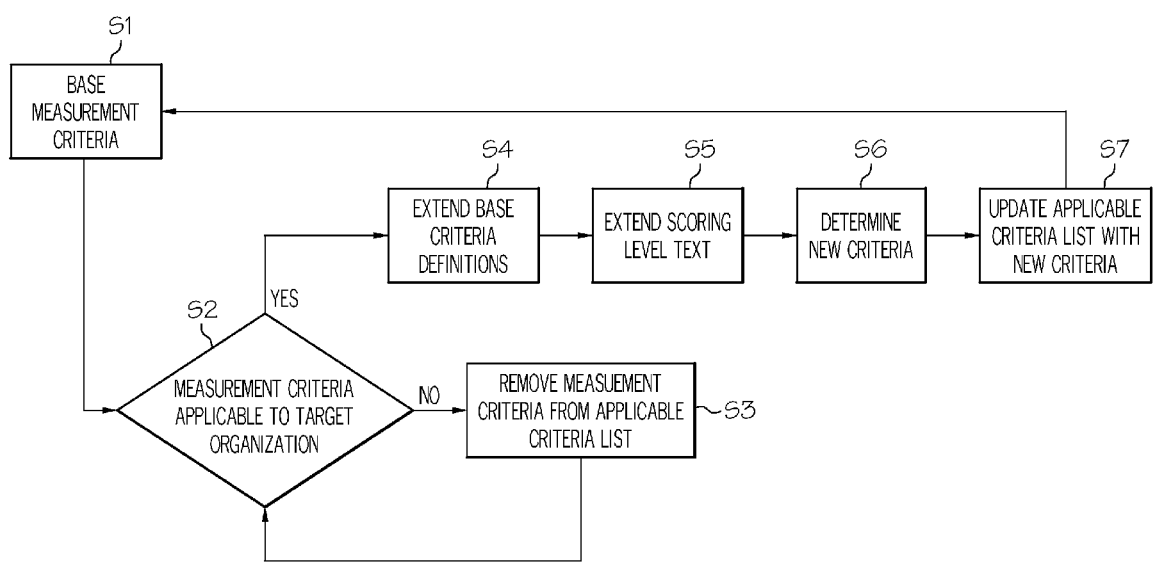
FIG. 2 depicts a first method flow diagram in accordance with the present invention.

Once the baseline criteria are provided, refinement system 34 will refine the baseline criteria to yield readiness criteria. Referring to FIG. 2, the refinement process is shown carried out by refinement system 34 (e.g., in conjunction with administrator 50) in greater detail. Specifically, in step S1, baseline criteria are provided. In step S2, it is determined whether each of the baseline criteria is applicable to the target organization. Analytically, applicable criteria are defined with the following elements:

(Industry∪OrganizationStructure∪KnownValues)∩MeasuredTech

MeasuredTech—This is the current technology, tool, or process being measured.

KnownValues—Any existing measurements of criteria on the applicable criteria list.

OrganizationStructure—This is the impact of the organizational structure. This is quantified relative to the organization being measured.

Any non-applicable baseline criteria are removed from the list in step S3. Conversely, the criteria definition of each applicable baseline criteria is extended in step S4 (as needed to be more consistent with the target organization). This information is then input into a scoring spreadsheet in a criteria definition column for later assignment of a score. To this extent, a scoring level text is extended for each of the values (e.g., 0-4) for all applicable criteria in each column (e.g., one for each of the 0-4 values) for each measurement criteria. In any event, additional criteria (with associated definitions and scoring level text) are then added to the baseline applicable criteria listing, which address items specific to the target organization in step S6. These additional criteria can be developed through interviews conducted with personnel of the target organization or other individuals, through consulting market research about the IT asset, etc. (collectively shown as input 52 FIG. 1). Specifically, the new criteria can be defined as involving the following elements:

(OrganizationStructure∩SubDeptStructure)∩MeasuredTech

MeasuredTech—This is the current technology, tool, or process being measured.

SubDeptStructure—This is the impact of any particular groups or departments within the target organization. The way you quantify this is relative to the organization being measured.

OrganizationStructure—This is the impact of the organizational structure. The way you quantify this is relative to the organization being measured.

Figure 3:
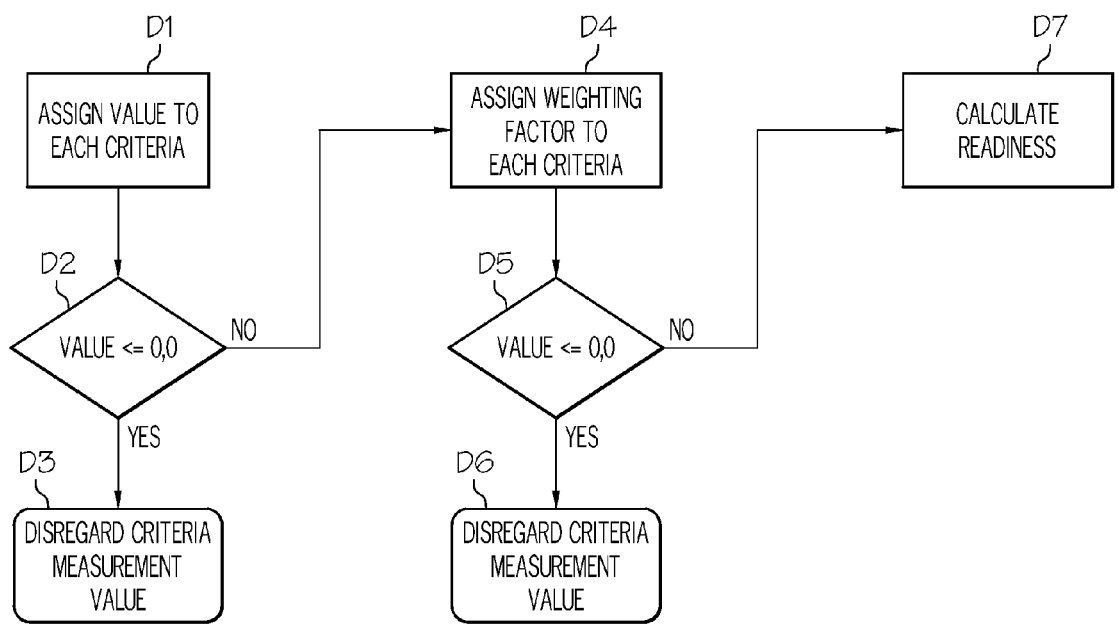
FIG. 3 depicts a second method flow diagram in accordance with the present invention.

The result is an updated criteria list containing readiness criteria, which are the union of the applicable criteria list with the newly added measurement criteria Once the readiness criteria are yielded, the computation of readiness can commence for the target organization. This overall process is generally performed by score assignment system 36, weighting system 38 and computation system 40 of FIG. 1. However, the process is illustrated in the method flow diagram of FIG. 3. In step D1, a score/value will be assigned by score assignment system 36 to the readiness criteria. The score can be assigned based upon input received from administrator 50 (FIG. 1). In step D2, it is determined whether the assigned score for any readiness criteria was less than or equal to zero. If so, such readiness criteria are disregarded/discarded from the list in step D3 (e.g., by any of the systems of readiness system 30 shown in FIG. 1).

For the readiness criteria not assigned a score in step, weighting system 38 could optionally assign a weight (e.g., from 0 to 1) to each such readiness criteria and/or its assigned score in step D4. For example, if readiness criterion "A" was deemed to be more important than readiness criteria "B", weighting system could multiply the score for readiness criteria "A" by 1.0, and the score for readiness criteria "B" by something lower (e.g., 0.5). Similar to the scores, the weighting values could be determined with input from administrator 50. Specifically, the weighting factor can be represented by the following elements:

ApplicableCriteriaList∩ExistingCustKnowledge∩IndustryKnowledge∩DirectCustomerInput ApplicableCriteriaList—This is the full list of base/original measurement criteria and any new criteria. This full list also includes updates and modifications to the base criteria to better fit the target organization where readiness is being examined.

ExistingCustKnowledge—This is the impact of existing knowledge of the target organization. This is indirect knowledge IndustryKnowledge—This is the impact and influence of industry or sector knowledge in which the target organization operates and executes.

DirectCustomerInput—This is the impact of any input coming directly from the target organization via either formal or informal channels.

In step D5, weighting system 38 will determine whether any readiness criteria has been weighted by a value less than or equal to zero. If so, such readiness criteria are disregarded/discarded from the list in step D6 (e.g., by any of the systems of readiness system 30 shown in FIG. 1). Then in step D7, computation system 40 will compute a readiness value for the target organization. In general, the readiness value represents an average of the scores (weighted or un-weighted) for the readiness criteria that are not disregarded/discarded. The key areas of readiness will address either (1) technology readiness, (2) process readiness, or (3) tool readiness. Thus, the computation for readiness includes both the value and weighting factors as well as additional criteria based on the following algorithm:

$$\left[ \frac{\sum_{1}^{NumberOfCriteria} (CriteriaValue \times CriteriaWeightingFactor)}{NumberOfCriteria} \right] \cap$$

$$\{Urgency \cap Demand \cap Capability \cap OrgMaturity\}$$

NumberOfCriteria—The number of applicable criteria that are being addressed. Any criteria that have a weighting of 0.0, are not part of this count. This is an integer number starting at 1.

CriteriaWeightingFactor—As calculated during the updating of the measurement criteria list. This is the weighting factor for each measured criteria.

CriteriaValue—This is the integer value assigned to each measurement criteria (from 0 to 4).

Urgency—A subjective assessment of how urgent the need for this technology, tool, or process is for the target organization.

Demand—A subjective assessment of any demand expressed by the target organization for the measured asset.

Capability—A subjective assessment of the target organization's capability to both understand and effectively leverage the measured asset.

OrgMaturity—An influencing factor to assess if the target organization is a mature or more new and untested organization. This is key to overall ripple impact of leveraging the measured asset across a target organization.

Once the readiness value has been computed, it will be compared by comparison system 42 (FIG. 1) to a threshold value to determine the readiness of the target organization (i.e., whether the target organization is truly ready to utilize the IT asset. In a typical embodiment, the target organization is ready if their readiness value meets or exceeds the threshold value. For example, if the threshold value was 2.9, and the readiness value for the target organization was 2.95, the target organization considered to be ready to utilize the IT asset. Conversely, if the readiness value was, for example, 2.4, the target organization would not be ready to utilize (e.g., the average of the scores), was 2.4 and the threshold value was 2.9, it would appear that the target organization was not ready to utilize the IT asset. In general, the threshold value represents an average readiness value for comparable organizations that successfully utilized the IT asset (e.g., based on historical data/previous analyses).

Regardless of the result, depiction generation system 44 (FIG. 1) can generate a set (e.g., at least one) of graphical depictions 54 (FIG. 1). In one graphical depiction, each of the criteria is plotted on a polar graph, and the readiness is applied as a kiviat formatted overlay on the polar graph. This will provide a single picture displaying the individual values, a readiness overlay (via the kiviat view) and areas to address in a visual format. Each of the criteria whose score detracts from the target organization being ready can have its value on the polar graph highlighted. This provides a visual indication of those criteria that will need to be more thoroughly addressed once overall readiness is calculated. That is, any changes needed on the part of the target organization can be readily identified. Still further the results for target organization used to update the threshold value/historical data. It should be understood that although scores and weights were describe as occurring after refinement of the baseline criteria, this need not be the case. For example, scores could be assigned to the baseline criteria before refinement. In any event these processes are further shown in the illustrative example set forth below:

ILLUSTRATIVE EXAMPLE

In this example, assume that the customer/target organization is a public school system that purchases approximately $40M per year in hardware, software, and professional services from a provider such as IBM Corp. (IBM is a trademark of International Business Machines Corp. of Armonk, N.Y. in the United States and/or other countries). In addition, further assume that the provider has a multi-year-bid partnership agreement in place. Moreover, this environment exhibits an increasingly typical situation where there are multiple technologies, tools, and processes in places that require manual and substantial efforts to maintain. All these disparate systems were purchased by separate departments for their specific needs. Often these systems exhibited a lack of extensibility, interoperability, and integration capability with existing enterprise processes. They were not ready to interoperate and become part of the enterprise technology ecosystem.

The school system asked the provider to determine the best path allowing technology and personnel resources to be shared while reducing the overall cost of maintenance. The provider suggested that the school system consider a portal-based solution as the focal point to begin to consolidate systems, data, information, and processes. The initial approach identified a client purchase of a portal server such as WebSphere Portal Server (WPS), including WPS installation and user interface design (WepSphere Portal Server and WPS are trademarks of International Business Machines Corp. in the United States and/or other countries). This was identified, at the time, as the correct choice for the environment. The intent was to allow for the consolidation of the information from various systems, data sources, and processes. This is a user centric design approach, and represented an appropriate approach on the surface. However, it does not take into account whether this client has all the necessary information, processes, and technologies to support the use of a portal. This risk was not obvious to the provider's team because the team focused on a product and technology-based approach (e.g. "package implementation") in the assumption it would provide a "turnkey" or "out of the box" solution. This is a core problem and can lead to wasted time, effort, and money.

Initially, the request to install a portal server and product was supported with the need to consolidate information and data; but there was no indication of where, how, or when the incorporation of portal functionality could occur. In addition, the provider had business motivations to further entrench their software in the environment. Moreover, the right approach was to analyze the environment to determine a best fit and understand if the environment could accommodate the introduction of a portal capability while minimizing impact to day-to-day operations.

Thus, the provider's team initially determined that the readiness of the school system's environment to accommodate a portal capability should be measured. The present invention was chosen as the measurement tool because the school system's technical and non-technical personnel would readily understand the state of the environment and the focus areas. "Buy-in" from the school system is important to ensure that they would be empowered to make the changes identified by the readiness system.

Baseline criteria were initially identified and assigned scores. The Enterprise Technology Readiness Model (ETRM) contains a fixed set of base criteria that can be measured. These criteria were assigned scores from 0 to 4. Because each IT asset is different, the meaning of the scores and criteria is relative to the asset being measured. For example, "0" is not always a "lack of readiness" and "4" does not always mean they are "ready" for an asset. The readiness is determined based on the combination of all scores (and a weighting factor) and the resulting gap identification graphic.

Referring to FIG. 4, an illustrative chart of baseline criteria and assigned scores is shown. The scores depicted were from a baseline measurement that shows ". . . an organization ready for portal capability . . ." The scores were recorded based on the definitions in a "scoring spreadsheet" tool that can be part of or accessed by readiness system 30 (FIG. 1). The un-weighted average (e.g., threshold value) of the scores was "2.9" for a ". . . portal ready environment . . ."

Figure 5A:
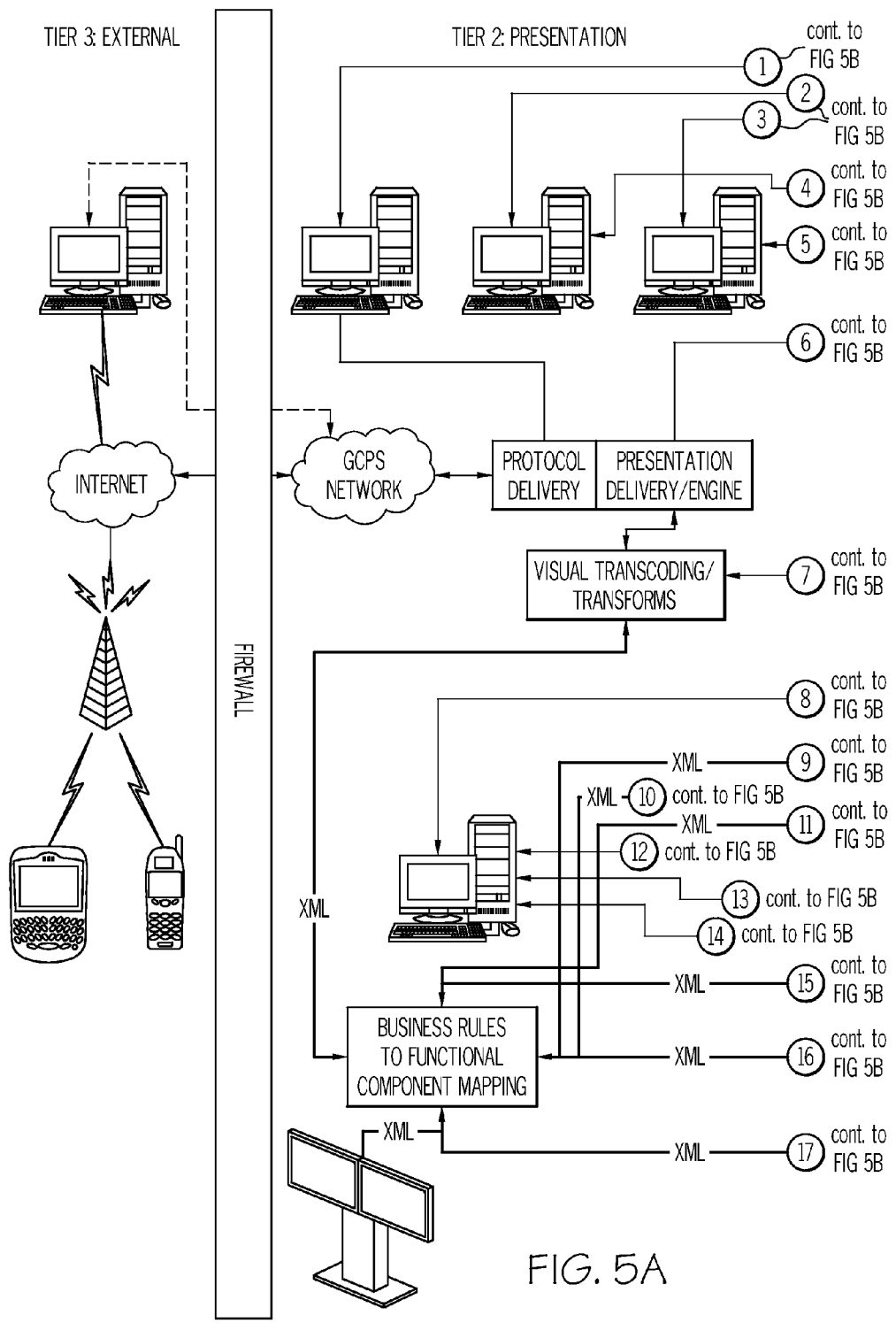
FIG. 5 depicts an illustrative view of an IT infrastructure of a target organization in accordance with the present invention.
Figure 5B:
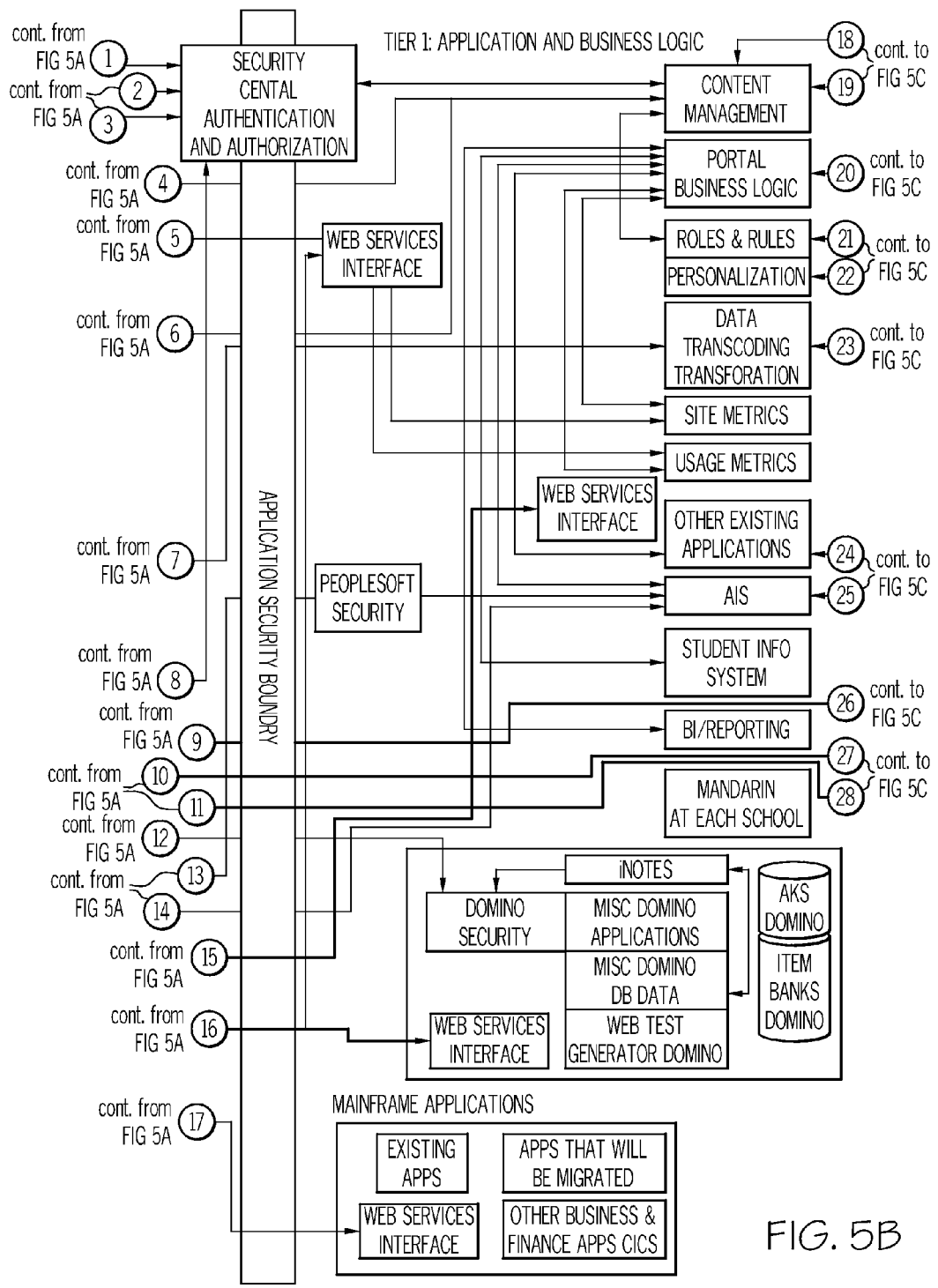
Figure 5C:
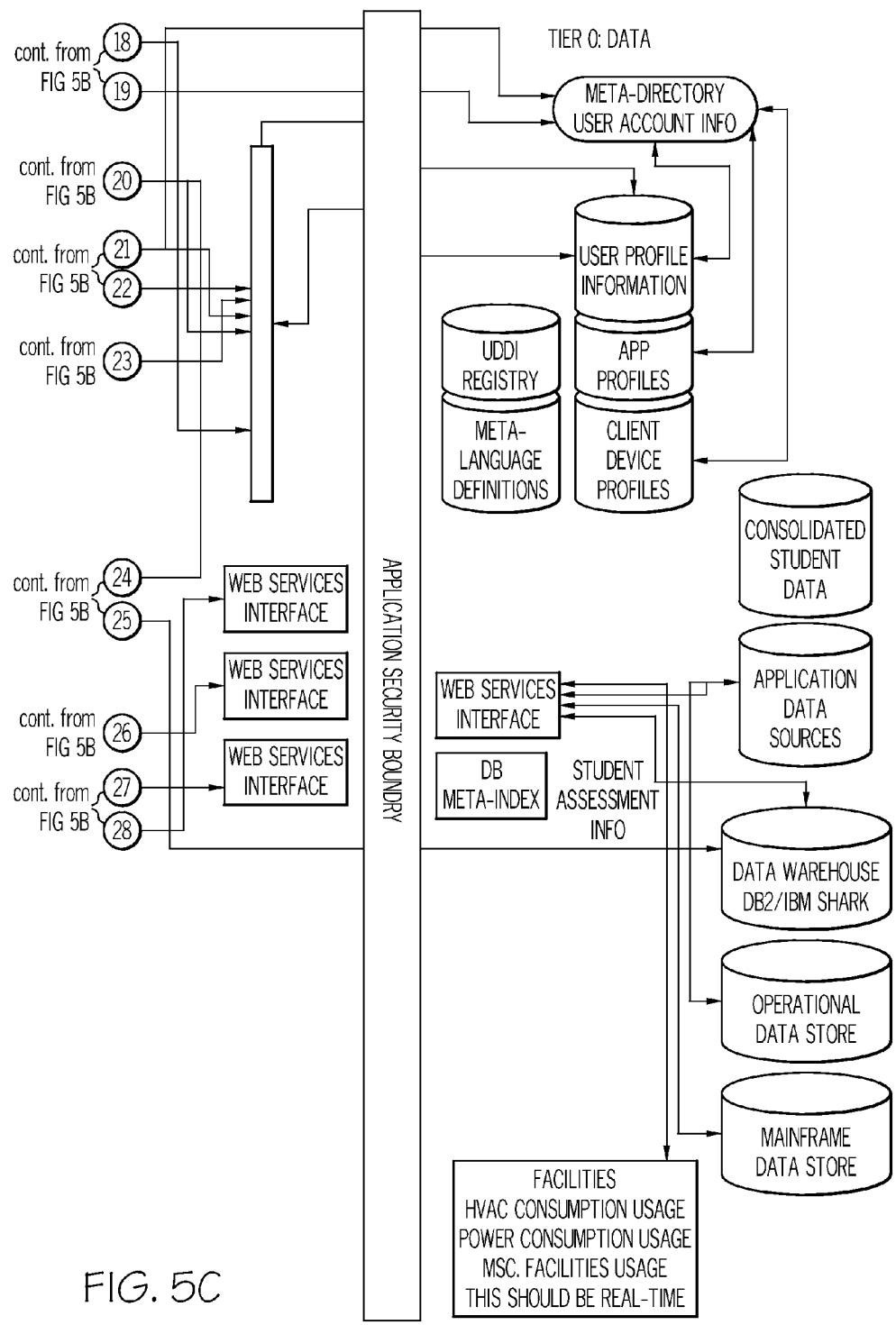

To refine the baseline criteria shown in FIG. 4, interviews were conducted with personnel of the school system. During the interview step, the provider's team wanted to determine more detailed information to further refine the initial measurement that was performed. The interviews focused on understanding the various data sources, data types, user types and groups, security constraints, and audiences. In this example, the interviews pointed to the existing architecture overview that was under construction. A subsequent architecture effort further validated the approach to measure if the client was in fact ready for portal capability. This is depicted in the FIG. 5, and represents a current system view 70.

Based on the refinement, additional criteria were added and assigned scores (the last four items in the list) to yield the readiness criteria. Specifically, as shown in FIG. 6, criteria 82A-D (and associated scores) was added to baseline criteria 60 shown in FIG. 4. The final computation/scoring was then performed. The un-weighted average (readiness value) was computed as "2.4". Thus, when this score is compared to the "ready" threshold value of 2.9, it is clear that although the client is not yet ready for portal capability, they are relatively close to being ready. The challenge is to identify the key areas that should be addressed to accelerate their "portal readiness". Using the table of FIG. 6, the areas that are key to portals are actually scored rather low (the last four criteria in the list 82A-D), and thus it is clear that these are key areas to address. However, it is sometimes non-intuitive to look at numeric scores and determine "gaps", where a picture is often much more effective.

Figure 7:
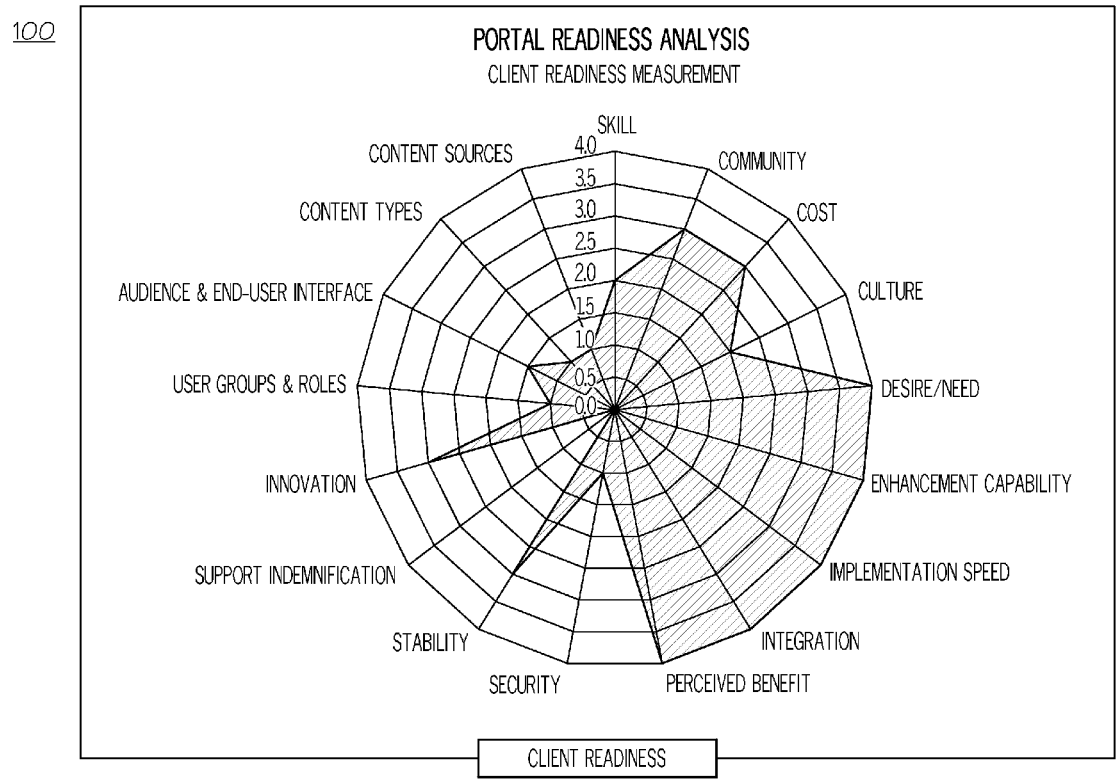
FIG. 7 shows a first illustrative graphical depiction in accordance with the present invention.
Figure 8:
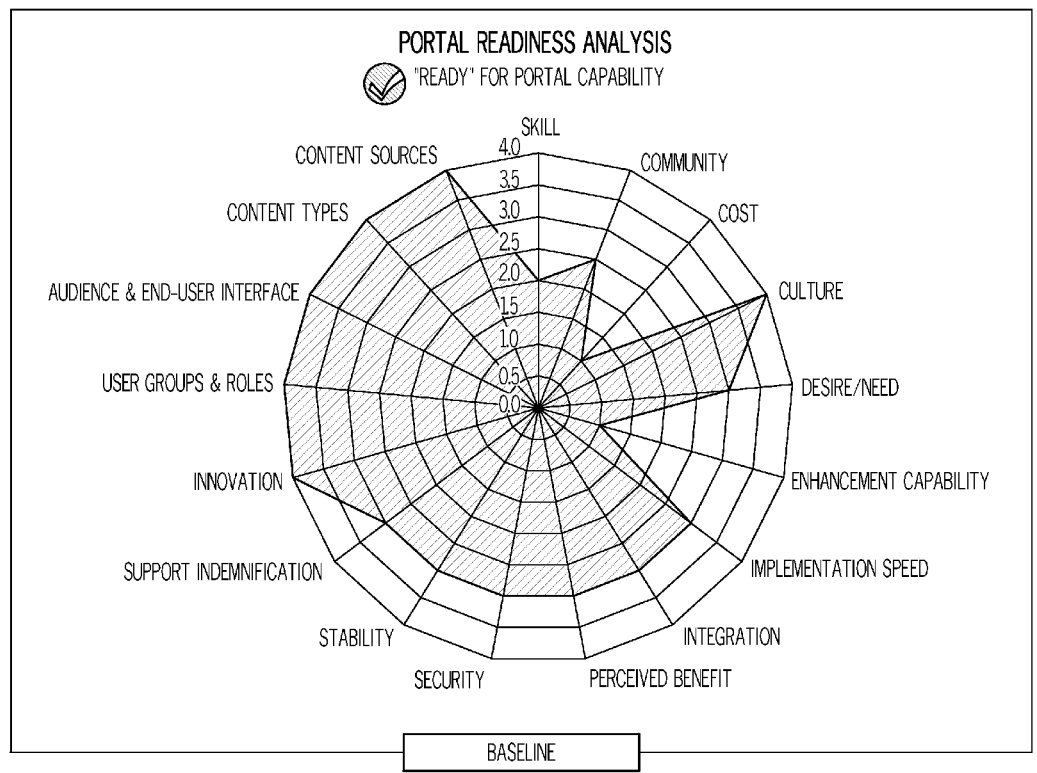
FIG. 8 shows another illustrative graphical depiction in accordance with the present invention.
Figure 9:
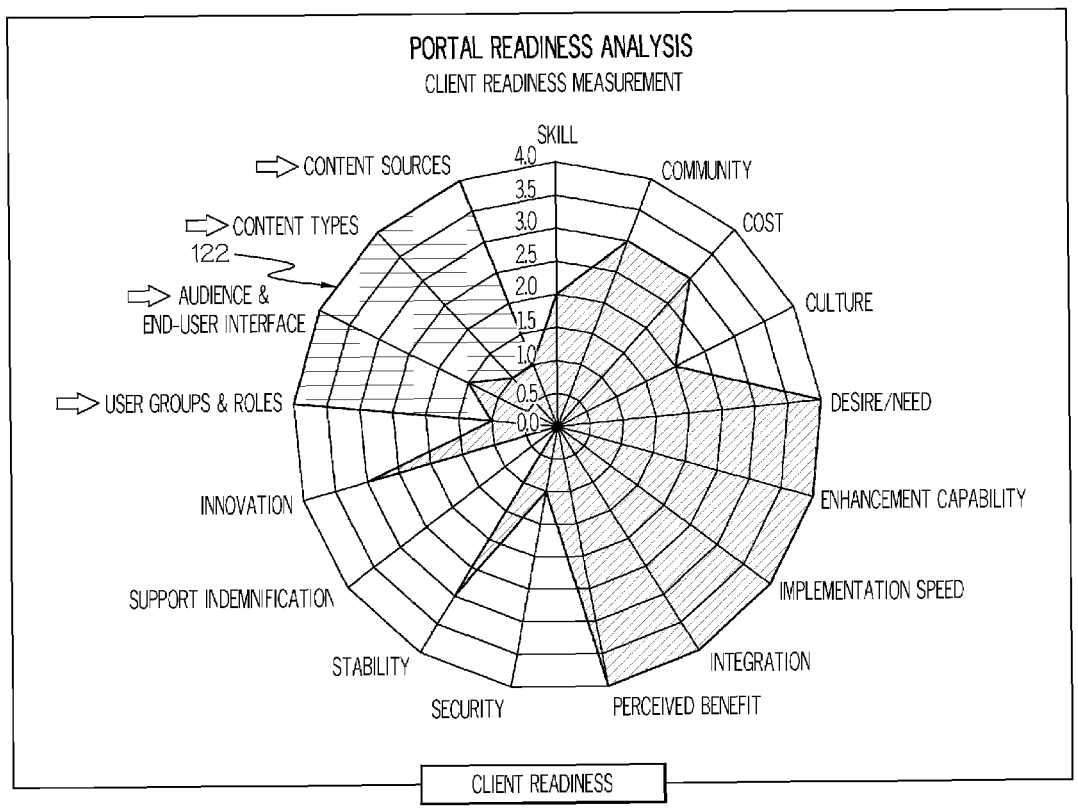
FIG. 9 shows another illustrative graphical depiction in accordance with the present invention.

Thus, once the scoring process is complete and validated, visualization was produced. In the case of this school system, their portal "readiness" measurement is shown in graphical depiction 100 of depicted in FIG. 7, entitled "Client Readiness", which shows readiness criteria and their scores. Once the initial visualization was complete, the team compared this with the baseline so that the gaps became apparent. Referencing graphical depiction 110 of FIG. 8, the threshold computation/measurement is depicted and is an example of an organization that is "ready" for portal capability (showing that organizations readiness criteria and scores). Graphical depiction 120 of FIG. 9 is a measure of the client's readiness with the gaps identified in the hashed area 122 in the upper left quadrant. In addition, the key criteria that need to be addressed are identified by the arrows (adjacent the Content Sources, Content Types, Audience End-User Interface, and User Group Roles criteria).

The result of this analysis was a refocus of effort in consolidating and streamlining the IT infrastructure at the school system. Specifically, the "Client Readiness" graphical depiction 100 of FIG. 7 demonstrated that there was four core areas that were not being addressed which were key to a successful portal implementation. The team identified that these areas were core to the organization and thus the overall approach should result in a paradigm shift from package implementation to an architecture-based approach with a focus on technology agnostic requirements. Thus, this initiated an Enterprise Architecture effort that engaged several resources for more than a year to begin the development of an Enterprise Architecture and identified numerous areas for significant additional professional services opportunities (including the implementation of portal based solution).

While shown and described herein as a method and system determining a readiness of a target organization to utilize an Information Technology (IT) asset, it is understood that the invention further provides various alternative embodiments. For example, in one embodiment, the invention provides a computer-readable/useable medium that includes computer program code to enable a computer infrastructure to determine a readiness of a target organization to utilize an Information Technology (IT) asset. To this extent, the computer-readable/useable medium includes program code that implements each of the various process of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a providing device, such as memory 18 (FIG. 1) and/or storage system 26 (FIG. 1) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to determine a readiness of a target organization to utilize an Information Technology (IT) asset. In this case, the service provider can create, maintain, support, etc., a computer infrastructure, such as computerized infrastructure 12 (FIG. 1) that performs the process of the invention for one or more customers. In return, the service provider can receive payment from the target organization(s) under a subscription and/or fee agreement and/or the service provider can receive payment from the sale of advertising content to one or more third parties.

In still another embodiment, the invention provides a computer-implemented method for determining a readiness of a target organization to utilize an Information Technology (IT) asset. In this case, a computerized infrastructure, such as computerized infrastructure 12 (FIG. 1), can be provided and one or more systems for performing the process of the invention can be obtained (e.g., created, purchased, used, modified, etc.) and deployed to the computerized infrastructure. To this extent, the deployment of a system can comprise one or more of (1) installing program code on a providing device, such as computer system 14 (FIG. 1), from a computer-readable medium; (2) adding one or more devices to the computer infrastructure; and (3) incorporating and/or modifying one or more existing systems of the computer infrastructure to enable the computerized infrastructure to perform the process of the invention.

As used herein, it is understood that the terms "program code" and "computer program code" are synonymous and mean any expression, in any language, code or notation, of a set of instructions intended to cause a providing device having an information processing capability to perform a particular function either directly or after either or both of the following: (a) conversion to another language, code or notation;

and/or (b) reproduction in a different material form. To this extent, program code can be embodied as one or more of: an application/software program, component software/a library of functions, an operating system, a basic I/O system/driver for a particular providing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for determining a readiness of a target organization to utilize an Information Technology (IT) asset, comprising:
   identifying baseline criteria for determining the readiness of the target organization to utilize the IT asset;
   refining the baseline criteria to yield readiness criteria by removing individual ones of the baseline criteria that are non-applicable to the IT asset and defining applicable ones of the baseline criteria with respect to a relationship between technology attributable to the IT asset and known data within the target organization and an industry of the target organization;
   assigning a numerical score to each of the readiness criteria for the target organization;
   computing, with a computer device, a readiness value for the target organization using a numerical average of the scores;
   comparing the readiness value to a threshold value to determine the readiness of the target organization, the threshold value representing an average of readiness values for comparable organizations to the target organization that have successfully utilized the IT asset; and
   generating at least one graphical depiction showing the readiness of the target organization for presentation to a user.

2. The method of claim 1, the refining comprising at least one of the following:
   conducting interviews about the baseline criteria; and
   consulting market research about the IT asset.

3. The method of claim 1, further comprising weighting the scores prior to the computing, wherein the computing comprises computing the readiness value for the target organization using the weighted scores.

4. The method of claim 1, wherein the computing comprises computing the readiness value by computing an average of the scores.

5. The method of claim 1, wherein the at least one graphical depiction comprises a first graphical depiction showing the scores for the readiness criteria.

6. The method of claim 5, wherein the at least one graphical depiction further comprises a second graphical depiction showing threshold values for the readiness criteria.

7. The method of claim 6, wherein the at least one graphical depiction further comprises a third graphical depiction showing a comparison of the scores to the threshold values for the readiness criteria.

8. A system for determining a readiness of a target organization to utilize an Information Technology (IT) asset, comprising:
   a computer device, having:
   a system for identifying baseline criteria for determining the readiness of the target organization to utilize the IT asset;
   a system for refining the baseline criteria to yield readiness criteria by removing individual ones of the baseline criteria that are non-applicable to the IT asset and defining applicable ones of the baseline criteria with respect to a relationship between technology attributable to the IT asset and known data within the target organization and an industry of the target organization;
   a system for assigning a numerical score to each of the readiness criteria for the target organization;
   a system for computing a readiness value for the target organization using a numerical average of the scores;
   a system for comparing the readiness value to a threshold value to determine the readiness of the target organization, the threshold value representing an average of readiness values for comparable organizations to the target organization that have successfully utilized the IT asset; and
   a system for generating at least one graphical depiction showing the readiness of the target organization.

9. The system of claim 8, the system for refining refines the baseline criteria by incorporating interview data about the baseline criteria.

10. The system of claim 8, further comprising a system for weighting the scores prior to the computing, wherein the system for computing comprises computes the readiness value for the target organization using the weighted scores.

11. The system of claim 8, wherein the system for computing computes an average of the scores.

12. The system of claim 8, wherein the at least one graphical depiction comprises a first graphical depiction showing the scores for the readiness criteria.

13. The system of claim 12, wherein the at least one graphical depiction further comprises a second graphical depiction showing threshold values for the readiness criteria.

14. The system of claim 13, wherein the at least one graphical depiction further comprises a third graphical depiction showing a comparison of the scores to the threshold values for the readiness criteria.

15. A program product stored on a computer useable medium for determining a readiness of a target organization to utilize an Information Technology (IT) asset, the computer useable medium comprising program code for causing a computer system to perform the following steps:
   identifying baseline criteria for determining the readiness of the target organization to utilize the IT asset;
   refining the baseline criteria to yield readiness criteria by removing individual ones of the baseline criteria that are non-applicable to the IT asset and defining applicable ones of the baseline criteria with respect to a relationship between technology attributable to the IT asset and known data within the target organization and an industry of the target organization;
   assigning a numerical score to each of the readiness criteria for the target organization;
   computing a readiness value for the target organization using a numerical average of the scores;
   comparing the readiness value to a threshold value to determine the readiness of the target organization, the threshold value representing an average of readiness values for comparable organizations to the target organization that have successfully utilized the IT asset; and
   generating at least one graphical depiction showing the readiness of the target organization.

16. The program product of claim 15, the refining being based on at least one of the following:
   interviews about the baseline criteria; and
   market research about the IT asset.

17. The program product of claim 15, the computer readable medium further comprising program code for causing the computer system to perform the following step: weighting the scores prior to the computing, wherein the computing comprises computing the readiness value for the target organization using the weighted scores.

18. The program product of claim 15, wherein the computing comprises computing the readiness value by computing an average of the scores.

19. The program product of claim 15, wherein the at least one graphical depiction comprises a first graphical depiction showing the scores for the readiness criteria.

20. The program product of claim 19, wherein the at least one graphical depiction further comprises a second graphical depiction showing threshold values for the readiness criteria.

21. The program product of claim 20, wherein the at least one graphical depiction further comprises a third graphical depiction showing a comparison of the scores to the threshold values for the readiness criteria.

22. A method for deploying a system for determining a readiness of a target organization to utilize an Information Technology (IT) asset, comprising:
providing a computer infrastructure being operable to:
identify baseline criteria for determining the readiness of the target organization to utilize the IT asset;
refine the baseline criteria to yield readiness criteria by removing individual ones of the baseline criteria that are non-applicable to the IT asset and defining applicable ones of the baseline criteria with respect to a relationship between technology attributable to the IT asset and known data within the target organization and an industry of the target organization;
assign a numerical score to each of the readiness criteria for the target organization;
compute a readiness value for the target organization using a numerical average of the scores;
compare the readiness value to a threshold value to determine the readiness of the target organization, the threshold value representing an average of readiness values for comparable organizations to the target organization that have successfully utilized the IT asset; and
generate at least one graphical depiction showing the readiness of a customer.

23. The method of claim 22, wherein the computer infrastructure is operable to refine the baseline criteria based on at least one of the following:
interviews about the baseline criteria; and
market research about the IT asset.

24. The method of claim 22, the computer infrastructure being further operable to weight the scores prior to the computing, wherein the readiness value for the target organization is computed using the weighted scores.

25. The method of claim 22, wherein the computing comprises computing the readiness value by computing an average of the scores.

26. The method of claim 22, wherein the at least one graphical depiction comprises a first graphical depiction showing the scores for the readiness criteria.

27. The method of claim 26, wherein the at least one graphical depiction further comprises a second graphical depiction showing threshold values for the readiness criteria.

28. The method of claim 27, wherein the at least one graphical depiction further comprises a third graphical depiction showing a comparison of the scores to the threshold values for the readiness criteria.

* * * * *